UNITED STATES PATENT OFFICE.

JACOB ALBERT ENGELER, OF WINTERTHUR, SWITZERLAND.

PROCESS OF BLEACHING COTTON FABRICS.

SPECIFICATION forming part of Letters Patent No. 304,088, dated August 26, 1884.

Application filed August 2, 1880. (No specimens.) Patented in France June 11, 1880, No. 137,212.

*To all whom it may concern:*

Be it known that I, JACOB ALBERT ENGELER, of Winterthur, Switzerland, have invented an Improved Process of Bleaching Manufactured Cotton; and I do hereby declare that the following is a full, clear, and exact description of the same. French Letters Patent for fifteen years from June 11, 1880, have been granted me for said invention.

My invention relates to a dry process of bleaching manufactured cotton, and more particularly cotton wound on spools or reels. The process consists in the following method of operating: In a closed vat of wood lined with lead, or of enameled sheet or cast iron—say three meters long, two meters wide, and one and one-half meters deep—are placed about one hundred and fifty kilograms of spooled or reeled cotton contained in baskets or crates or otherwise. The vat is put into communication, by means of an india-rubber pipe or other suitable conduit, with an apparatus made of stoneware or glass, in which are mixed one part of unslaked lime and one part of chloride of lime, with one part of spirits of wine or acetic acid and four parts of water, the whole being heated and treated with sulphuric acid, in the usual manner of making chloroform, whereby about two and one-half cubic meters of vapors of chloroform are produced. The said vapors are, however, not condensed, as is usually done, but are, under a pressure of about two atmospheres, carried to the vat, and will thoroughly bleach in two hours the whole of the cotton contained in the vat. The cotton is dechlorinized or deodorized after bleaching by introducing into a Woulfe bottle containing sulphuric ether, through suitable tubes, hydrogen and carbonic acid, which are mixed in the Woulfe apparatus and there saturated with the sulphuric ether. These gases are then conducted into the vat which contains the cotton to be dechlorinized The proportions of the elements of the mixture and the arrangement of the apparatus may be varied without departing from the invention, and any one or more of the substances mentioned may be replaced by any other chemical equivalent.

I do not claim the method of producing chloroform, as such, nor, broadly, the use of vapors of chloroform under pressure, as described in English Patent No. 362 of 1856.

I claim—

1. The process herein described of treating cotton fabrics by first exposing the same to vapors of chloroform under pressure and then dechlorinizing the same by exposure to a mixture of hydrogen, carbonic acid, and sulphuric ether, substantially as specified.

2. The process of deodorizing or dechlorinizing dry bleached fabric by exposing it to a mixture of hydrogen, carbonic acid, and sulphuric ether, substantially as specified.

JACOB ALBERT ENGELER.

Witnesses:
EMILE MITTLER,
MATHÄUS HIRZEL.